United States Patent [19]

Hayashi

[11] Patent Number: 4,716,783
[45] Date of Patent: Jan. 5, 1988

[54] INTERMITTENT GEAR LOCK MECHANISM

[75] Inventor: Hideki Hayashi, Tokyo, Japan

[73] Assignee: Clarion Co., Ltd., Tokyo, Japan

[21] Appl. No.: 850,249

[22] Filed: Apr. 10, 1986

[30] Foreign Application Priority Data

Apr. 18, 1985 [JP] Japan .................................. 60-81460

[51] Int. Cl.$^4$ ............................................. F16D 43/26
[52] U.S. Cl. ....................................... 74/527; 74/84 R; 74/112; 192/33 R
[58] Field of Search ................. 74/84 R, 125.5, 112, 74/527; 192/33 R, 28

[56] References Cited

U.S. PATENT DOCUMENTS

| | | | |
|---|---|---|---|
| 1,175,509 | 3/1916 | Cooper | 192/33 R |
| 1,379,877 | 5/1921 | Rolker | 192/33 R |
| 3,092,226 | 6/1963 | Williamson | 192/28 X |
| 3,495,693 | 2/1970 | Limberger | 74/84 |
| 4,310,087 | 1/1982 | Gawler | 192/33 R |
| 4,572,013 | 2/1986 | Kasukave | 74/112 X |

FOREIGN PATENT DOCUMENTS

| | | | |
|---|---|---|---|
| 2021471 | 6/1969 | Fed. Rep. of Germany | 192/28 |
| 9833 | 12/1900 | Norway | 192/28 |

Primary Examiner—Randolph A. Reese
Assistant Examiner—Joseph A. Fischetti
Attorney, Agent, or Firm—Russell E. Hattis; Stephen R. Arnold

[57] ABSTRACT

An intermittent gear wheel lock mechanism includes major engaging portions and secondary engaging portions formed on one surface of an intermittent gear wheel and spaced by a predetermined distance. When an unlock lever is inserted, and a lock member is detached from the major engaging portion, the lock member is moved to the movement path of the secondary engaging portion while the unlock member remains in the inserted position, so that the lock member engages the secondary engaging portion which reaches there as the intermittent gear wheel rotates, and locks the intermittent gear wheel unrotatable. When the unlock lever returns to its original position, the lock member moves from the secondary engaging portion to the movement path of the major engaging portion and engages same to lock the intermittent gear wheel unrotatable.

3 Claims, 4 Drawing Figures

INTERMITTENT GEAR LOCK MECHANISM

FIELD OF THE INVENTION

This invention relates to an intermittent gear wheel lock mechanism for locking an intermittent gear wheel which is used in a tape player as a drive source of a channel changing mechanism, loading/ejection mechanism, head carrying mechanism and others.

BACKGROUND OF THE INVENTION

To effect motor-driven changes of modes and programs (tape travelling directions) in a tape player, an arrangement is required where driving power from a motor is transmitted to individual mechanisms only upon mode or program changes. An arrangement which has been used in the prior art for this purpose includes an intermittent gear wheel located near a continuously rotating drive gear wheel. In a normal condition of the tape player where no change is desired, the intermittent gear wheel is locked unrotatable at a position where a cutout partly breaking a series of teeth along the outer circumference of the intermittent gear wheel is opposed to the drive gear wheel so that no rotation is transmitted to the intermittent gear wheel. Upon any change of modes or programs, the intermittent gear wheel is unlocked, and the series of teeth thereof engages the drive gear wheel so that the rotation of the motor is thereafter transmitted to other members via the intermittent gear wheel.

FIG. 2 shows a prior art arrangement of such an intermittent gear wheel mechanism which includes an intermittent gear wheel with two cutouts along the outer circumference thereof so that a change plate for channel changing operation is reciprocated by every half revolution of the intermittent gear wheel.

More specifically, the intermittent gear wheel 61 is rotatable about an axle 62 and engageable with the drive gear wheel 63 located at a fixed position and driven by a motor (not shown) of the tape player. The intermittent gear wheel 61 has two symmetrical cutouts 64a, 64b partly breaking a series of teeth along the outer circumference thereof. On one surface of the intermittent gear wheel 61 are provided two symmetrical engaging portions 65a, 65b associated with the cutout 64a, 64b.

A pin 66 is formed on the surface of the intermittent gear wheel 61 and received in an elongated hole 68 formed in the change plate 67.

Near the intermittent gear wheel 61 is provided an L-shaped lock link 70 pivotable about an axle 69. One extension of the lock link 70 has a hook-shaped lock portion 71 at the distal end thereof for engagement with the engaging portions 65a, 65b. A spring 72 biases the lock link 70 to bring the lock portion 71 to an engageable position. The other extension of the lock link 70 has a pin 73 at the distal end thereof which is pushed by a push portion 75 of an unlock lever 74 when the lever 74 is inserted.

Opposite to the lock link 70 is mounted a sub-lock link 77 pivotably about an axle 76. A spring 72 biases the sub-lock link 77 in a direction for bringing a lock portion 78 at one distal end of the link 77 into engagement with the engaging portions 65a, 65b of the intermittent gear wheel 61. The other distal end of the sub-lock link 77 is provided with a pin 79 with which a push portion 80 of the unlock lever 74 engages to bias the sub-lock link 77 in a releasable direction against the energy of the spring 72.

The unlock lever 74 is always biased in a withdrawal direction by a spring 81.

In a normal operation of the prior art arrangement, since the lock portion 71 of the lock link 70 engages the engaging portion 65a due to the energy of the spring 72, the intermittent gear wheel 61 is locked at an angular position where the cutout 64a faces the drive gear wheel 63. Therefore, the intermittent gear wheel 61 is unrotatable regardless of rotation of the drive gear wheel 63, and no program change is effected.

On a channel change, when the unlock lever 74 is compressed, the push portion 75 thereof pushes the pin 73 and rotates the lock link 70 against the energy of the spring 72. Thereby the lock portion 71 is detached from the engage portion 65. The intermittent gear wheel 61 is now allowed to slightly rotate with a priming force applied thereto from the change plate 67, and the circumferential teeth thereof engage the drive gear wheel 63. After this, the intermittent gear wheel 61 is rotated by the drive gear wheel 63, and the pin 66 of the gear wheel 61 received in the elongated hole 68 moves the change plate 67 upward. Thereby a known channel changing mechanism is activated.

The unlock lever 74 is now allowed to return with the energy of the spring 81, and the push portion 75 thereof is detached from the pin 73. With a subsequent half revolution of the intermittent gear wheel 61, the second engaging portion 65b engages the lock portion 71, and the intermittent gear wheel 61 is locked again at an angular position where the second cutout 64b faces the drive gear wheel 63. As a result, no rotation is transmitted from the drive gear wheel 63, and the change plate 67 comovable with the intermittent gear wheel 61 is locked until a subsequent operation by the unlock lever 74.

In the prior art lock mechanism described above, if the unlock lever 74 remains at the inserted position, the lock link 70 is continuously pushed and cannot bring the lock portion 71 into engagement with the engaging portion 65b. Therefore, the intermittent gear wheel 61 continues rotation after the cutout 64b reaches the drive gear wheel 63, and the change plate 67 once having moved returns to its original position.

To prevent such an overrun of the intermittent gear wheel 61, an improved prior art mechanism employs the sub-lock link 77 which is rotated in an engageable direction by the spring 72 while the unlock lever 74 is inserted, so that the lock portion 78 of the sub-lock link 77 lockingly engages the engaging portion 65a which failed to engage the lock portion 71 of the lock link 70.

After the unlock lever 74 withdraws, the push portion 80 thereof rotates the sublock link 77 against the energy of the spring 72 so as to detach the lock portion 78 from the first engaging portion 65a. Regardless of the release of the sublock link 77, since the lock portion 71 of the lock link 70 immediately engages the second engaging portion 65b due to the withdrawal of the lever 74, the intermittent gear wheel 61 cannot rotate before it engages the drive gear wheel 63.

The improved prior art mechanism certainly has the advantage that no error will occur during channel changing operation, because the intermittent gear wheel 61 never fails to stop after a half revolution regardless of non-return of the unlock lever 74. However, the use of two lock links invites a complicated structure of the mechanism. In particular, timely control of two lock links with respect to insertion of the unlock lever to establish reliable engagement or disengagement with respect to the engaging portions of the intermittent gear requires a more difficult design and accuracy of the mechanism.

OBJECT OF THE INVENTION

It is therefore an object of the invention to provide an intermittent gear wheel lock mechanism employing a single lock member associated with an improved configuration of the engaging portions on the surface of the intermittent gear wheel which assures the same operation of the mechanism as the prior art operation using two lock links, simplifying the construction due to reduction of the number of parts or members and establishing a reliable operation of the mechanism.

SUMMARY OF THE INVENTION

According to the present invention, there is provided an intermittent gear wheel lock mechanism comprising:

an intermittent gear wheel rotatably mounted and having at least one cutout partly breaking a series of circumferential teeth thereof;

at least one set of major engaging portion and secondary engaging portion provided on one surface of the intermittent gear wheel, said major engaging portion being located rearward of said secondary engaging portion with respect to the rotational direction of the intermittent gear wheel by a predetermined distance, said both engaging portions also being radially spaced by a predetermined distance;

a lock member capable of entering said radial distance between said both engaging portions and movable radially of the intermittent gear wheel to engage one of said engaging portions to lock said intermittent gear wheel;

a first spring biasing said lock member toward said major engaging portion;

an unlock lever movable back and ahead, said unlock lever being adapted to push said lock member from said major engaging portion to said secondary engaging portion against energy of said first spring when it is moved ahead, and unlock said intermittent gear wheel; and a second spring biasing said unlock lever in a withdrawal position.

DETAILED DESCRIPTION

Figure 1A:
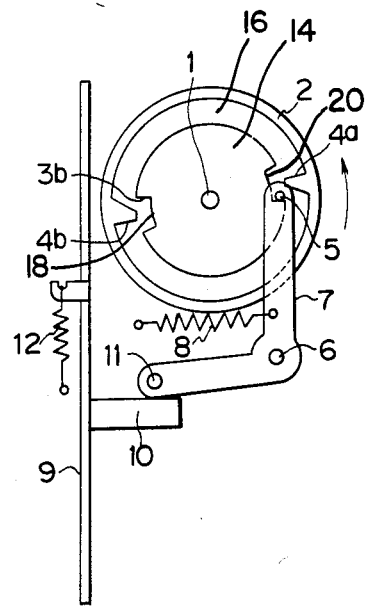
FIGS. 1A through 1C are plan views of an intermittent gear wheel lock mechanism embodying the invention where the intermittent gear wheel is locked in FIG. 1A, the intermittent gear wheel is going to be locked in FIG. 1B, and the intermittent gear wheel is completely locked by a secondary engaging portion in FIG. 1C.

The invention is hereinbelow described in detail, referring to a preferred embodiment illustrated in the drawings.

Figure 1B:
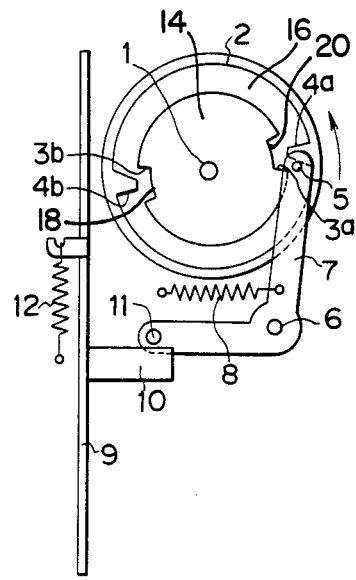
Figure 1C:
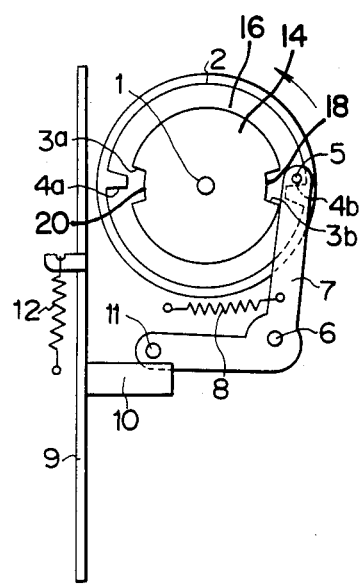
Figure 2:
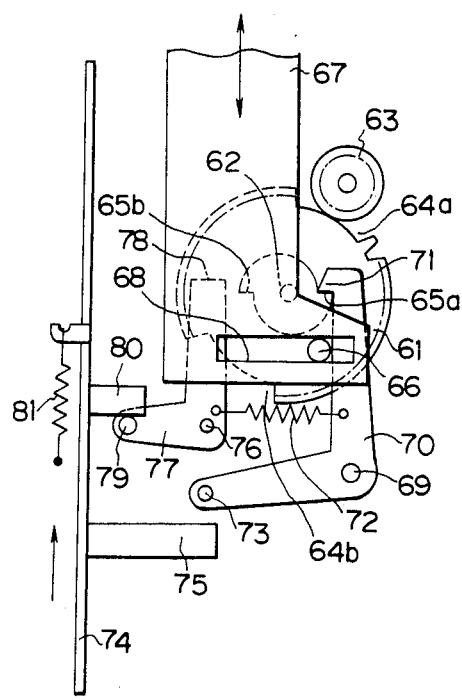
FIG. 2 is a plan view of a prior art lock mechanism.

In FIGS. 1A through 1C, an intermittent gear 2 rotatable about axle 1 has the substantially same structure as that of the intermittent gear wheel 61 of FIG. 2, and includes on one surface thereof a grove 16 having major engaging portions 3a, 3b located symmetrically with respect to the axle 1 to lock the intermittent gear wheel 2 every half revolution. The major engaging portions 3a, 3b employed in this embodiment are configured as rotationally retarded radial walls of recesses formed relatively near the axle 1 and opening radially outward of the center of the intermittent gear wheel 2. More specifically, the central portion of the surface of the intermittent gear wheel has a plane 14 higher than the surface 16 (groove bottom) surrounding the central portion, and the higher plane is formed with two offset recesses 18,20 along the outer margin thereof. Each recess is defined by two radial walls, and one of these radial walls which follows the other in rotation of the intermittent gear wheel serves as the major engaging portion 3a or 3b. Associated with the major engaging portions 3a, 3b are provided secondary engaging portions 4a, 4b which are rotationally forwarding-facing walls of projections extending toward the axle 1 and located rotationally advanced and disposed radially outward of the major engaging portions 3a, 3b. Each pair of major engaging portion 3a or 3b and secondary engaging portion 4a or 4b are spaced by a distance permitting a pin-shaped lock member 5 to pass therebetween.

The pin-shaped lock member 5 is formed at one distal end of an L-shaped lock link 7 pivotable about an axle 6 and biased by a spring 8 toward the axle 1 of the intermittent gear wheel 2. The other distal end of the lock link 7 is provided with a pin 11 which is pushed by a push portion 10 formed on an unlock lever 9 when the unlock lever 9 is inserted.

The unlock lever 9 is provided with a spring 12 which brings the inserted unlock lever 9 to its original position.

With this arrangement, before the unlock lever 9 is inserted as shown in FIG. 1A, the push portion 10 thereof does not push the pin 11, so that the lock member 5 maintains engagement with the first major engaging portion 3a with the energy of the spring 8. Therefore, the intermittent gear wheel 2 is prevented from rotation, and no rotation is transmitted from a drive gear wheel (not shown but substantially identical with that of FIG. 2).

When the unlock lever 9 is inserted, the push portion 10 thereof rotates the lock link 7 against the energy of the spring 8, the lock member 5, as shown in FIG. 1B, is detached from the major engaging portion 3a and moves radially outward of the intermittent gear wheel 2. As the result, the intermittent gear wheel 2 is unlocked and allowed to engage and rotate with the drive gear wheel to activate a change plate and/or other members (not shown but identical with those of FIG. 2). Arrangements for driving the change plate and other members are not limited to those of FIG. 2, but any other arrangement may be employed if it is adapted to drive the change plate, etc. by rotation of the intermittent gear wheel.

If the unlock lever 9 is left at the inserted position, the lock member 5 is also left at a radially outward position with respect to the intermittent gear wheel 2. Therefore, when the second major engaging portion 3b moves toward the lock member 5 as the intermittent gear wheel 2 rotates, the second secondary engaging portion 4b rotationally in advance of the major engaging portion 3b first approaches the lock member 5 which is still located radially outward, and locks the intermittent gear wheel 2. Therefore, regardless a failure in return of the unlock lever 9, rotation of the intermittent gear wheel 2 is reliably stopped. After this, when the unlock lever 9 is released and returns to its original position, the push portion 10 does not push the pin 11 any more, and the lock link 7 rotates toward the axle 1 under the energy of the spring 8 and moves away from the secondary engaging portion 4b. Due to this, the intermittent gear wheel 2 slightly rotates. However, since the major engaging portion 3b follows the secondary engaging portion 4b, the lock member 5 having rotated radially inward soon engages the major engaging portion 3b, so that the intermittent gear wheel 2 is soon locked and maintained unrotatable.

As described, since the invention uses the major engaging portions and secondary engaging portions on the intermittent gear wheel for sequential engagement with a single lock member it does not require two lock links which were indispensable in the prior art, and simplifies the structure of the mechanism.

The invention is not limited to the illustrated arrangement, but the major engaging portions may be provided radially outward of the intermittent gear wheel to cooperate with secondary engaging portions provided nearer to the axle of the intermittent gear wheel.

If the intermittent gear wheel is adapted to cause one reciprocation of other members by a full rotation thereof, the circumferential cutout, major engaging portion and secondary engaging portion may each number one. If the intermittent gear wheel is adapted to cause one reciprocation of other members by 1/n rotation thereof, it will be necessary to provide n sets of circumferential cutouts, major engaging portions and secondary engaging portions. Additionally, the unlock lever, although illustrated as being returned by the spring 12 connected to the unlock lever, may be adapted to be inserted by the spring 8 connected to the lock link 7 or alternatively manually without assistance of spring energy. In short, the subject matter of the invention is the arrangement of the lock link and the intermittent gear wheel, and the arrangement of the unlock member may be any selected one of known structures.

As described, the invention mechanism can reliably locks the intermittent gear wheel by a single lock member at a proper position regardless of failure of return of the unlock lever, by using major engaging portions and secondary engaging portions on the intermittent gear wheel.

The embodiments of the invention in which an exclusive property or privilege is claimed are defined as follows:

1. A lock mechanism for an intermittently driven wheel of a tape player comprising:
   at least one trapping region having a major engaging portion and a secondary engaging portion provided on one surface of said wheel, said major engaging portion being located rearward of said secondary engaging portion with respect to the rotational direction of said wheel by a predetermined distance, said both engaging portions also being radially spaced by a predetermined distance to establish a generally confronting partial overlap therebetween and a generally radially disposed passage therebetween;
   a lock member having a locking portion configured to enter said radial passage between said both engaging portions and movable radially of said wheel to selectively engage either of said engaging portions to lock said wheel;
   a first spring for biasing said lock member portion to confront said major engaging portion;
   restricting means for restricting the movement of said lock portion between a first position for engaging said major engaging portion and a second position for engaging said secondary engaging portion;
   an unlock lever movable back and ahead, said unlock lever being coupled to push said lock member through said passage and out of confrontation with said major engaging portion to subsequently rotationally confront said secondary engaging portion and against the energy of said first spring when said unlock lever is moved ahead so as to unlock said wheel; and
   a second spring for biasing said lock lever in a back position.

2. The lock mechanism of claim 1 wherein said wheel has on said one surface thereof a central portion extending therefrom and provided with at least one generally radially inwardly extending offset recess along the outer margin of said central portion, said intermittent gear also having extending from said one surface thereof at least one peripherally disposed projection extending generally radially inward and partially into said offset recess, portions of said offset recess and said projection forming said major engaging portion and said secondary engaging portion respectively.

3. The lock mechanism of claim 1 wherein said restricting means includes a generally annularly displaced groove in said one surface and having inner and outer walls between which said locking portion is confiningly disposed, said inner groove wall having a generally radially inwardly extending recess, said outer wall having a generally radially inwardly extending projection confronting said recess, a portion of said recess forming said major engaging portion and a portion of said projection forming said secondary engaging portion.

* * * * *